US012771646B2

(12) United States Patent
Devarajan

(10) Patent No.: US 12,771,646 B2
(45) Date of Patent: Oct. 20, 2026

(54) EFFICIENT INTERNAL LATENCY MEASUREMENT IN NETWORK DEVICES

(71) Applicant: HEWLETT PACKARD ENTERPRISE DEVELOPMENT LP, Spring, TX (US)

(72) Inventor: Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 87 days.

(21) Appl. No.: 19/068,913

(22) Filed: Mar. 3, 2025

(65) Prior Publication Data

US 2026/0163840 A1 Jun. 11, 2026

(30) Foreign Application Priority Data

Dec. 11, 2024 (IN) ............................ 202441098112

(51) Int. Cl.
*H04L 47/283* (2022.01)

(52) U.S. Cl.
CPC .................................. *H04L 47/283* (2013.01)

(58) Field of Classification Search
CPC ....... H04L 41/082; H04L 41/12; H04L 41/16; H04L 41/26; H04L 43/026; H04L 63/0876; H04L 63/1408; G06F 11/3006; G06F 11/3055; H04W 12/06; H04W 84/12; H04W 12/121; H04W 12/71
USPC .......................................................... 709/224
See application file for complete search history.

(56) References Cited

U.S. PATENT DOCUMENTS

2012/0230348 A1* 9/2012 Pannell ................. H04L 47/245 370/437
2018/0316599 A1* 11/2018 McDonald .............. H04L 45/02

FOREIGN PATENT DOCUMENTS

WO WO-2022028456 A1 * 2/2022 .............. H04L 47/11

* cited by examiner

*Primary Examiner* — Karen C Tang
(74) *Attorney, Agent, or Firm* — Yao Legal Services, Inc.

(57) ABSTRACT

In a network, a network device can receive, at the forwarding hardware of the network device from a processor of the network device, a packet with an indicator indicating the packet to be a delay measurement packet via a processor port of the processor. The network device can tag, using the forwarding hardware, the packet with a first timestamp indicating a time when the forwarding hardware receives the packet. The network device can then forward, using the forwarding hardware, the packet to an egress queue of an egress network port of the network device. The network device can retrieve, using the forwarding hardware, the packet from the egress queue and tag the packet with a second timestamp indicating a time when the forwarding hardware retrieves the packet for forwarding. The network device can include, using the forwarding hardware, a delay indicated by the first and second timestamps into the packet.

20 Claims, 9 Drawing Sheets

EFFICIENT INTERNAL LATENCY MEASUREMENT IN NETWORK DEVICES

BACKGROUND

A network device, such as a switch, may support different network protocols and services, many of which depend on reliable clock information. The network device can maintain its clock by running a clock synchronization protocol, such as Precision Time Protocol (PTP).

BRIEF DESCRIPTION OF THE FIGURES

In the figures, like reference numerals refer to the same figure elements.

DETAILED DESCRIPTION

Figure 1A:
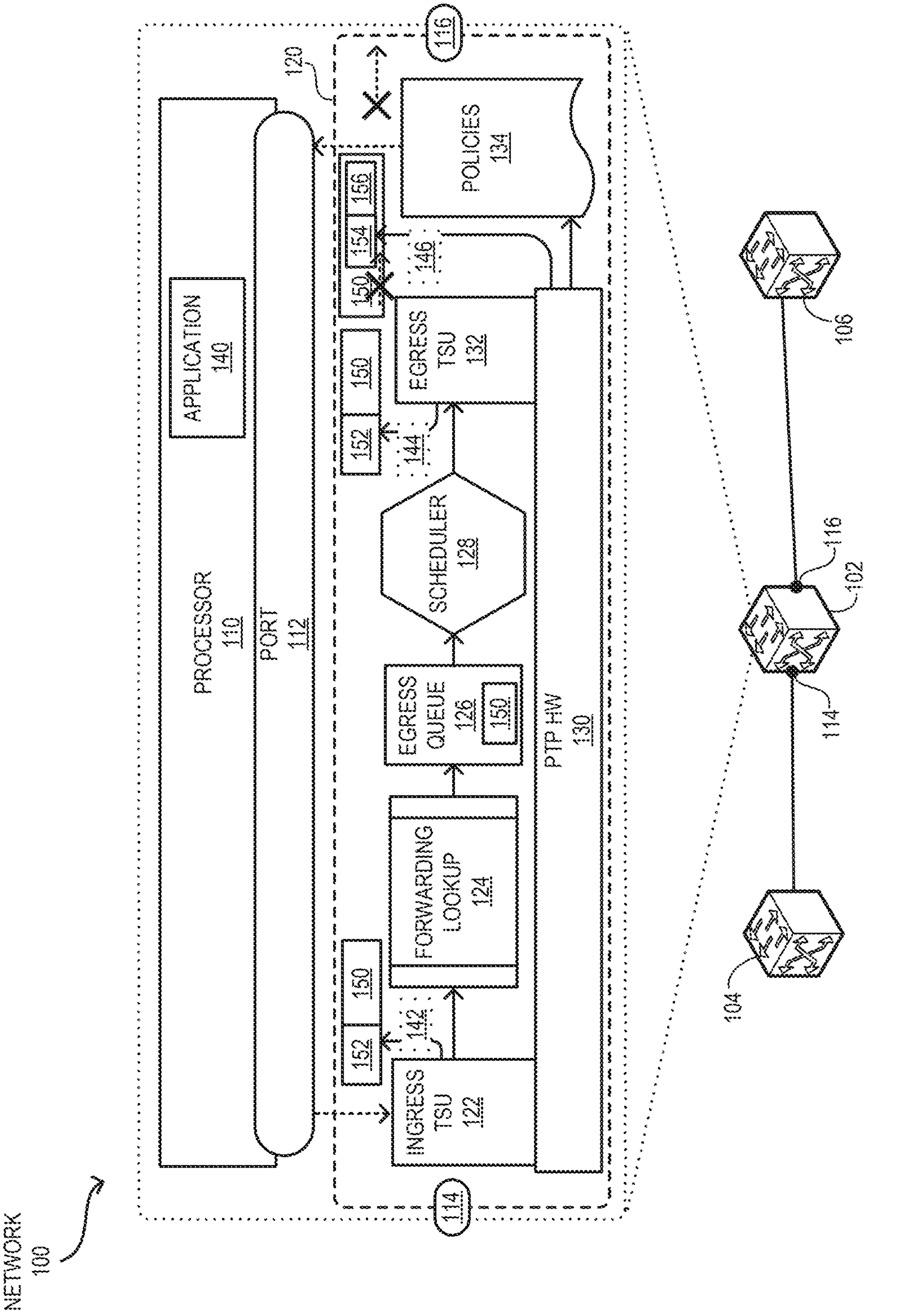
FIG. 1A illustrates an example of a network device measuring internal latency using a delay measurement packet, in accordance with an aspect of the present application.

A network device, such as a switch, can have versatile capabilities. Some of the capabilities may require clock synchronization among the network devices. A time synchronization protocol, such as Precision Time Protocol (PTP), can be used to synchronize the respective clocks of the network devices in a network. If PTP is enabled in a network, it can deploy a grandmaster clock (GMC), which can provide a time reference in the network. Typically, the GMC can be a specialized network appliance that can maintain accurate time in the network. The GMC may obtain time information (e.g., Universal Time Coordinated (UTC) time information) from an external source, such as a satellite-based clock signal.

PTP allows a network device to be configured with a Transparent Clock (TC) that can propagate time information in the network. A network device configured with a TC can be referred to as a TC device. The GMC can periodically send an advertisement packet (e.g., a PTP event packet) comprising the time information in the network. A TC device can receive the advertisement packet and forward the advertisement packet to downstream network devices. When the TC device receives the advertisement packet, it can determine the internal delay of the TC device and include the internal delay in a predetermined field of the advertisement packet. The internal delay, which can also be referred to as a residence delay, can indicate the time taken by the advertisement packet to traverse through the network device from the ingress port to the egress port of the advertisement packet. The internal delay of the TC device can be used as an offset to the time advertised by the GMC by the downstream device to determine the current time.

The aspects described herein address the problem of additional resource and bandwidth utilization for determining the internal delay of a packet in a network device by (i) internally generating an advertisement packet within the network device; (ii) tagging the advertisement packet with ingress and egress timestamps; and (iii) determining the internal delay incurred by the advertisement packet based on the ingress and egress timestamps. Instead of receiving the advertisement packet from a GMC from an ingress network port, the internal packet can be issued from a processor port of the processing resource. The forwarding hardware of the network device can tag the internal packet with the ingress and egress timestamps and forward the internal packet via the internal queues of the network device. The forwarding hardware can calculate the internal delay based on the timestamps, include the internal delay in the packet, and provide the internal packet via the processor port. In this way, the network device can determine the internal delay in the network device using the internal packet without utilizing additional resources or bandwidth.

Typically, the round-trip time (RTT) of a packet can indicate the total round-trip latency on a network path. Since the network path can include a number of network devices interconnected via corresponding links, the RTT may not indicate internal delays at individual network devices. Some network devices can support the enforcement of Internet Protocol (IP) service-level agreement (SLA) or IP-SLA. These network devices can generate synthetic packets for different ingress and egress network port combinations and measure the delay incurred by these packets. Here, a respective combination can indicate the delay between the ingress and egress ports in the combination. However, because a network device can have many ingress and egress network ports, enforcement of the IP-SLA can cause the network device to generate a large number of synthetic packets, which can unnecessarily occupy the bandwidth of the network device.

The network device may also use Inband Flow Analysis (IFA), which can measure queuing delays of real traffic forwarded via the network device. When a packet passes through a queue, such as an egress queue of an egress network port, the network device can add the delay incurred by the packet in the queue in an additional header of the packet. Because the additional header can be added to a large number of packets, the additional headers collectively can utilize a significant portion of the bandwidth of the network device. Therefore, some of the bandwidth of the network device may not be available for forwarding the real traffic.

However, IFA requires additional hardware in the network device to measure the delay and incorporate the information of the delay in the additional header. As a result, the network device can become more expensive. In addition, some network protocols, such as Ethernet, can limit the maximum number of bytes, which is referred to as the Maximum Transmission Unit (MTU), that can be included in a packet. Consequently, the additional header can reduce the payload of the packet because a portion of the MTU is used by the additional header. As a result, the IP packets in the network can become more fragmented, and the network needs to be pre-provisioned to accommodate the additional header.

To address this issue, the network device can run a monitoring application. The monitoring application can be a demon, which can be a piece of software executing on at least one processing resource of the network device for recording internal delays using PTP event packets. During operation, the network device can send an advertisement packet to the forwarding hardware of the network device. The forwarding hardware can be the application-specific integrated circuit (ASIC) of the network device that can receive, process, and forward packets. This advertisement packet can be a PTP event packet used for determining the internal delay within the network device. Therefore, the advertisement packet can be referred to as an internal packet.

The network device can issue the internal packet from the monitoring application. Hence, instead of receiving it from a GMC via an ingress network port, the forwarding hardware can receive the internal packet from a processor port of the processing resource running the monitoring application. The processor port can couple the processing resource to the forwarding hardware of the network device (e.g., via the backplane of the network device). A processor port is distinct from a network port, which can couple the network device to a link coupled to another device. Therefore, the processor port can couple internal components of the network device (i.e., within the network device) while the network port can externally couple the network device to another device.

Typically, a network device is equipped with the PTP hardware integrated into its forwarding hardware to allow the processing of the PTP event packets, such as the internal packet. Since the header field of a packet indicates what type of packet it is, the forwarding hardware can detect the internal packet as a PTP event packet based on the header fields of the internal packet. Accordingly, the network device can use the PTP hardware to process the internal packet without requiring additional hardware. When the internal packet arrives at the forwarding hardware, the PTP hardware can tag the internal packet with an ingress timestamp indicating when the internal packet is received by the forwarding hardware in accordance with the PTP protocol.

Tagging the internal packet with the ingress timestamp can include inserting the ingress timestamp into the forwarding metadata (e.g., the ASIC metadata) associated with the internal packet. The forwarding metadata can include information needed for internally forwarding the internal packet through the forwarding hardware within the network device. The forwarding metadata can be maintained in a storage medium (e.g., a register) in the forwarding hardware. The forwarding metadata can also include information indicating an egress port for the internal packet. In some examples, the monitoring application can predetermine the egress port to determine the internal delay for that particular egress port.

Since the forwarding metadata associated with the internal packet can include forwarding information, the forwarding hardware can determine to which egress network port the internal packet should go by performing a forwarding lookup based on the forwarding metadata. Subsequently, the forwarding hardware may internally forward the packet to the egress network port within the network device. When the internal packet arrives at the egress network port, the packet can be stored in the egress queue associated with the egress network port. If the egress network port supports multiple priorities, such as priority-based flow control supported by the Ethernet, there can be a plurality of egress queues associated with the egress network port. The network device can then also indicate the priority of the internal packet in the forwarding metadata. As a result, the internal packet can be used to measure the delay associated with the combination of a particular egress network port and priority.

If a priority is assigned to the internal packet, the network device can insert the internal packet into the egress queue associated with the corresponding priority. Such a queue can be referred to as a priority queue. Subsequently, a scheduler in the forwarding hardware can select the internal packet from the egress queue for transmission. Here, the scheduler can select which egress network port should transmit a packet. If the egress ports are associated with corresponding priorities, the scheduler may also select from which priority queue the packet should be transmitted. Examples of a scheduler can include, but are not limited to, a round-robin scheduler, a policy-based scheduler, a token-bucket scheduler and its variants, and a random scheduler. When the scheduler selects the internal packet for transmission, the forwarding hardware can retrieve the internal packet from the egress queue for forwarding (i.e., for transmitting via the egress network port).

When the internal packet is extracted from the egress queue and ready for transmission, the internal packet has incurred the internal delay, which can include the processing delay (e.g., time taken to determine the egress network port) and the queueing delay (e.g., time taken in the egress queue). The PTP hardware can tag the internal packet with an egress timestamp indicating when the internal packet is obtained from the egress queue for forwarding by the forwarding hardware in accordance with the PTP protocol. The PTP hardware can then calculate the internal delay for the internal packet based on the ingress and egress timestamps. If the ingress timestamp indicates a time $t_1$ and the egress timestamp indicates a time $t_2$, the internal delay can be calculated as $(t_2-t_1)$. Subsequently, the PTP hardware can include the internal delay in the internal packet. For example, the internal delay can be included in a "correction field" in the internal packet. The correction field can be a reserved field in a PTP event packet for incorporating the internal delay within a network device. In this way, the internal packet can incorporate the internal delay it has incurred within the network device.

When the network device (e.g., using the monitoring application) issues the internal packet to the forwarding hardware, the network device can include an indicator that can indicate the internal packet as a delay measurement packet and as a processor-generated packet instead of an actual PTP event packet. In some examples, the indicator can be a predefined value in the "message type" field of the internal packet. The message type field can be a reserved field in a PTP event packet. PTP supports a range of values that are reserved for user-defined purposes. The predefined value can be a value selected from the range of values. For example, an administrator may configure the network device to include the value "0x0E" from the range of values in the message type. As a result, when the indicator is detected in the internal packet, the forwarding hardware can determine the packet as a delay measurement packet and can apply one or more forwarding policies to the internal packet.

For example, the forwarding hardware can be preprogrammed with a set of forwarding policies applicable to the internal packet. The forwarding policies can include dropping any PTP event packet with the indicator and sending a copy of the internal packet via the processor port. Since the internal packet is generated within the network device, the internal packet does not incorporate a time value provided by the GMC. Therefore, the internal packet should not be forwarded via the egress network port and can be dropped based on the forwarding policies. Furthermore, by sending the internal packet via the processor port, the network device can provide the internal packet comprising the internal delay to the monitoring application, which can then obtain the internal delay from the internal packet and provide it to an administrator.

The network ports of the network device can be integrated with the forwarding hardware (e.g., in a fixed form factor) or distributed across a set of NICs of the network device. The NICs can be inserted into the corresponding interfaces of the backplane of the network device. Examples of a NIC interface can include but are not limited to, Peripheral Component Interconnect (PCI) interfaces, PCI Express (PCIe) interfaces, and Universal Serial Bus (USB) interfaces. If the ports are distributed across NICs, the ingress and egress network ports of a packet are often on different NICs. Therefore, the internal delay in the network device can include the delay incurred by a packet while being received at an ingress NIC, forwarded via the backplane to the egress queue in an egress NIC, and transmitted from an egress queue in the egress NIC.

Therefore, to determine the internal delay between NICs in a network device, the network device, from the monitoring application via the processor port, can provide the internal packet to the forwarding hardware of an ingress NIC. The forwarding hardware of the ingress NIC can tag the internal packet with the ingress timestamp and determine the egress network port (e.g., based on the forwarding metadata). The ingress NIC can then forward the internal packet to an egress NIC comprising the egress port via the interconnect (e.g., the switching fabric on the backplane) of the network device. The egress NIC can insert the internal packet in an egress queue. When the scheduler selects the internal packet in the egress queue for transmission, the forwarding hardware of the egress NIC can retrieve the internal packet from the egress queue and tag the internal packet with an egress timestamp. The forwarding hardware of the egress NIC can then determine the internal delay based on the ingress and egress timestamps and include the internal delay in the internal packet.

In some examples, the PTP hardware may not calculate the internal delay and, hence, does not include it in the internal packet. Instead, the PTP hardware can insert the egress timestamp in a timestamp queue in the forwarding hardware. The forwarding hardware can then send the internal packet with its forwarding metadata via the processor port based on the forwarding policy. The PTP hardware can still tag the internal packet with the ingress timestamp when the internal packet is received by the forwarding hardware. Hence, the forwarding metadata can include the ingress timestamp associated with the internal packet. Upon receiving the internal packet, the monitoring application can obtain the ingress timestamp from the forwarding metadata. The monitoring application can then obtain the egress timestamp from the timestamp queue via the processor port. For example, the monitoring application can poll the timestamp queue to obtain the egress timestamp. The monitoring application can calculate the internal delay for the internal packet based on the ingress and egress timestamps.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to an endpoint of a link that can receive or transmit data. "Port" can also refer to the hardware, software, and/or firmware logic that can facilitate the operations of that port.

FIG. 1A illustrates an example of a network device measuring internal latency using a delay measurement packet, in accordance with an aspect of the present application. A network 100 can include a number of network devices (e.g., switches), and may include network devices, such as layer-2 and layer-3 hops, and tunnels. In some examples, network 100 can be an Ethernet network, InfiniBand network, or other network, and may use a corresponding communication protocol, such as IP, FibreChannel over Ethernet (FCOE), or other protocols. Network 100 can include network devices 102, 104, and 106. These network devices can be individual physical network devices or networking units (e.g., switching units, such as switch-blades) within a chassis. One or more network devices in network 100 may be coupled to an external network (not shown in FIG. 1A) (e.g., a wide-area network (WAN), such as the Internet).

A respective network device in network 100 can be assigned a MAC address and an IP address and can include at least one processing resource. Examples of a processing resource can include, but are not limited to, a processor core, a graphics processing unit (GPU), and a tensor processing unit (TPU). The network device can also include at least one non-transitory computer-readable medium storing instructions that, when executed by the processing resource, causes the processing resource to perform one or more operations. The network device can further include forwarding hardware (e.g., the application-specific integrated circuit (ASIC) of the network device, which can at least incorporate a Ternary content-addressable memory (TCAM)).

An RTT can be used to determine the delays associated with a network device, such as network device 104. However, the RTT can indicate the round-trip delay of a packet on a network path, which can include network devices 102, 104, and 106 and the links between them. Hence, the RTT may not indicate internal delays at an individual network device, such as network device 102. If network device 102 supports IP-SLA, network device 102 can generate synthetic packets for different ingress and egress network port combinations and measure the delay incurred by these packets. For example, network device 102 can generate synthetic packets between network ports 114 and 116 of network device 102 for determining the delay for packets received at network port 114 and sent via network port 116. In this example, network ports 114 and 116 can be integrated with forwarding hardware 120 in a fixed form factor. Because network device 102 can have many ingress and egress network ports, enforcement of the IP-SLA can cause network device 102 to generate a large number of synthetic packets, which can unnecessarily occupy the bandwidth of network device 102.

Alternatively, network device 102 may also use IFA to measure queuing delays of real traffic forwarded via forwarding hardware 120 of network device 102. Forwarding hardware 120 can be the ASIC of network device 102 that can receive, process, and forward packets. When a packet passes through a queue, such as an egress queue 126 of egress network port 116, network device 102 can add the delay incurred by the packet in queue 126 in an additional header of the packet. The additional header, therefore, can include the information indicating the delay incurred by that packet. Because the additional header can be added to a large number of packets, the additional headers collectively can utilize a significant portion of the bandwidth of network device 102.

Furthermore, IFA requires additional hardware in network device 102 to measure the delay and incorporate the information of the delay in the additional header. As a result, network device 102 can become more expensive. In addition, some network protocols, such as Ethernet, can limit the maximum number of bytes (i.e., the MTU) that can be transmitted via network port 116. Consequently, the additional header can reduce the payload of the packet because a portion of the MTU is used by the additional header. As a result, the IP packets in network 100 can become more fragmented, and network 100 needs to be pre-provisioned to accommodate the additional header.

To address this issue, network device 102 can run a monitoring application 140, which can be a software daemon executing on at least one processing resource, such as processor 110 of network device 102. Application 140 can record internal delays in network device 102 using PTP event packets. During operation, network device 102 can send internal packet 150 from application 140 to forwarding hardware 120 via processor port 112. Processor port 112 can couple processor 110 to forwarding hardware 120 via the backplane of network device 102. Processor port 112 is distinct from network ports 114 and 116, which can couple network device 102 to links coupled to network devices 104 and 106, respectively. Therefore, processor port 112 can couple internal components of network device 102 while network ports 114 and 116 can externally couple network device 102 to network devices 104 and 106, respectively.

Packet 150 can be a PTP event packet used for determining the internal delay within network device 102. Network device 102 can issue packet 150 from application 140. Since application 140 executes on processor 110, forwarding hardware 120 can receive packet 150 from processor port 112 of processor 110. Typically, network devices 102, 104, and 106 are equipped with PTP hardware that can process the PTP event packets. For example, network device 102 can include PTP hardware 130 integrated into forwarding hardware 120 for processing PTP event packets, such as packet 150. PTP hardware 130 can include a PTP transceiver implemented in accordance with the Institute of Electrical and Electronics Engineers (IEEE) 1588 standard. Since the header field of a packet indicates what type of packet it is, forwarding hardware 120 can detect packet 150 as a PTP event packet based on the header fields of packet 150. Accordingly, network device 102 can use PTP hardware 130 to process packet 150 without requiring additional hardware. PTP hardware 130 (e.g., the PTP transceiver) can include an ingress timestamping unit (TSU) 122 and an egress TSU 124. A respective TSU can include hardware that can tag a packet with a corresponding timestamp in accordance with the PTP protocol.

When packet 150 arrives at forwarding hardware 120, ingress TSU 122 can tag packet 150 with an ingress timestamp 142, indicating when packet 150 is received by forwarding hardware 120. Here, timestamp 142 can indicate the arrival or ingress time of packet 150 at forwarding hardware 120. Tagging packet 150 with timestamp 142 can include inserting timestamp 142 into forwarding metadata 152 (e.g., the ASIC metadata) associated with packet 150. Metadata 152 can include information needed for internally forwarding packet 150 through forwarding hardware 120. Metadata 152 can be maintained in a storage medium (e.g., a register) in forwarding hardware 120. Metadata 152 can also include information indicating an egress network port, which can be network port 116 in this example, for packet 150. In some examples, application 140 can predetermine network port 116 as the egress network port for packet 150.

Since metadata 152 can include forwarding information, an identifier of network port 116 can be included in metadata 152. Accordingly, forwarding hardware 120 can determine that packet 150 should be forwarded to network port 116 by performing forwarding lookup 124 on metadata 152. In other words, forwarding lookup 124 on metadata 152 can indicate network port 116 as the egress network port for packet 150. Forwarding hardware 120 can then internally forward packet 150 to network port 116. When packet 150 arrives at network port 116, packet 150 can be stored in an egress queue 126 of network port 116. In some examples, network port 116 can support multiple priorities, such as priority-based flow control provided by Ethernet. Under such circumstances, network port 116 can be associated with a plurality of egress queues, each corresponding to a priority (e.g., in accordance with the IEEE 802.1Qbb standard). The forwarding information in metadata 152 can then indicate a priority for packet 150. Hence, packet 150 can be used to measure the delay associated with network port 116 for a specific priority. If a priority is assigned to packet 150, egress queue 126 can be a priority queue associated with the corresponding priority.

Subsequently, scheduler 128 in forwarding hardware 120 can select packet 150 from queue 126 for transmission via network port 116. Here, scheduler 128 can select the network port and the associated priority for transmission. Examples of scheduler 128 can include, but are not limited to, a round-robin scheduler, a policy-based scheduler, a token-bucket scheduler and its variants, and a random scheduler. When scheduler 128 selects packet 150 in queue 126 for transmission, forwarding hardware 120 can retrieve packet 150 from queue 126 for forwarding. When packet 150 is extracted from queue 126 and ready for transmission, packet 150 has incurred the internal delay network device 102 is intended to measure. Hence, egress TSU 132 can tag packet 150 with egress timestamp 144, indicating when packet 150 is obtained from queue 126 by forwarding hardware 120 in accordance with the PTP protocol. Here, timestamp 144 can indicate the departure or egress time of packet 150 from forwarding hardware 120.

PTP hardware 130 can then calculate internal delay 146 based on ingress timestamp 142 and egress timestamp 144. If ingress timestamp 142 indicates a time $t_1$ and egress timestamp 144 indicates a time $t_2$, internal delay 146 can be calculated as $(t_2-t_1)$. Subsequently, PTP hardware 130 can include internal delay 146 in packet 150. For example, PTP hardware 130 can include internal delay 146 in a correction field 154, which can be a reserved field in packet 150 for including the internal delay since packet 150 can be a PTP event packet. Correction field 154 in packet 150 can be dedicated for incorporating the internal delay within network device 102. In this way, PTP hardware 130 can associate ingress timestamp 142 and egress timestamp 144 with packet 150, determine internal delay 146 incurred by packet 150 within network device 102 based on timestamps 142 and 144, and include internal delay 146 in packet 150.

When network device 102, from application 140, issues packet 150 to forwarding hardware 120, network device 102 can include an indicator 156 that can indicate packet 150 as a delay measurement packet. Indicator 156 can also indicate packet 150 as a processor-generated packet instead of an actual PTP event packet. In some examples, indicator 156 can be a predefined value in the "message type" field of packet 150. The message type field can be a reserved field in a PTP event packet. PTP supports a range of values that are reserved for user-defined purposes. An administrator can select the predefined value from this range of values. For example, the administrator may configure network device 102 to include the value "0x0E" from the range of values as indicator 156 in the message type field of packet 150. As a result, when indicator 156 is detected in packet 150, forwarding hardware 120 can determine packet 150 as a delay measurement packet and can apply one or more forwarding policies 134 to packet 150.

For example, forwarding hardware 120 can be preprogrammed with policies 134 applicable to packet 150. Policies 134 can include a policy indicating that forwarding hardware 120 is to drop any PTP event packet with indicator 156 (denoted with a cross). Furthermore, policies 134 can include another policy indicating that forwarding hardware 120 is to send a copy of packet 150 via processor port 112. Since packet 150 is generated within network device 102, packet 150 does not incorporate a time value provided by the GMC. Therefore, packet 150 should not be forwarded via network port 116 and can be dropped at network port 116 based on policies 134. Accordingly, forwarding hardware 120 can send packet 150 via processor port 112, thereby providing packet 150 comprising internal delay 146 to application 140. Application 140 can then obtain internal delay 146 from packet 150 and provide it to an administrator.

In some examples, network ports 114 and 116 can be distributed across two NICs of network device 102. Here, the NICs can be inserted into the corresponding interfaces of the backplane of network device 102. Examples of such an interface can include, but are not limited to, PCI, PCIe, and USB interfaces. Since ports 114 and 116 are distributed across the NICs, internal delay 146 in network device 102 can include the delay incurred by a packet while being forwarded between these NICs. Therefore, to determine internal delay 146, network device 102 can provide packet 150 to an ingress NIC, which can include network port 114. Here, processor 110 can be included in the ingress NIC (not shown in FIG. 1A). Packet 150 can then be issued from processor 110 via processor port 112. Forwarding hardware 120 can receive packet 150 from processor port 112.

Ingress TSU 122 can then tag packet 150 with ingress timestamp 142. Forwarding hardware 120 can determine network port 116 as the egress network port (e.g., based on metadata 152), which can be included in the egress NIC. Packet 150 can then be inserted in queue 126 of network port 116 in the egress NIC. When scheduler 128 selects packet 150 for transmission, packet 150 can be retrieved from queue 126. Egress TSU 132 can then tag packet 150 with egress timestamp 144. Subsequently, PTP hardware 130 can determine internal delay 146 based on ingress timestamp 142 and egress timestamp 144 and include internal delay 146 in correction field 156 of packet 150. Based on policies 134, network device 102 can drop packet 150 at network port 116 instead of forwarding it to network device 104 and can send a copy of packet 150 to processor 110 via the egress NIC. Upon receiving packet 150, the egress NIC can forward packet 150 via the backplane to processor 110 (e.g., using an inter-process communication mechanism), thereby providing packet 150 to application 140. For example, the egress NIC can send packet 150 to processor 110 via a shared memory, message queue, or bus on the backplane of network device 102.

Figure 1B:
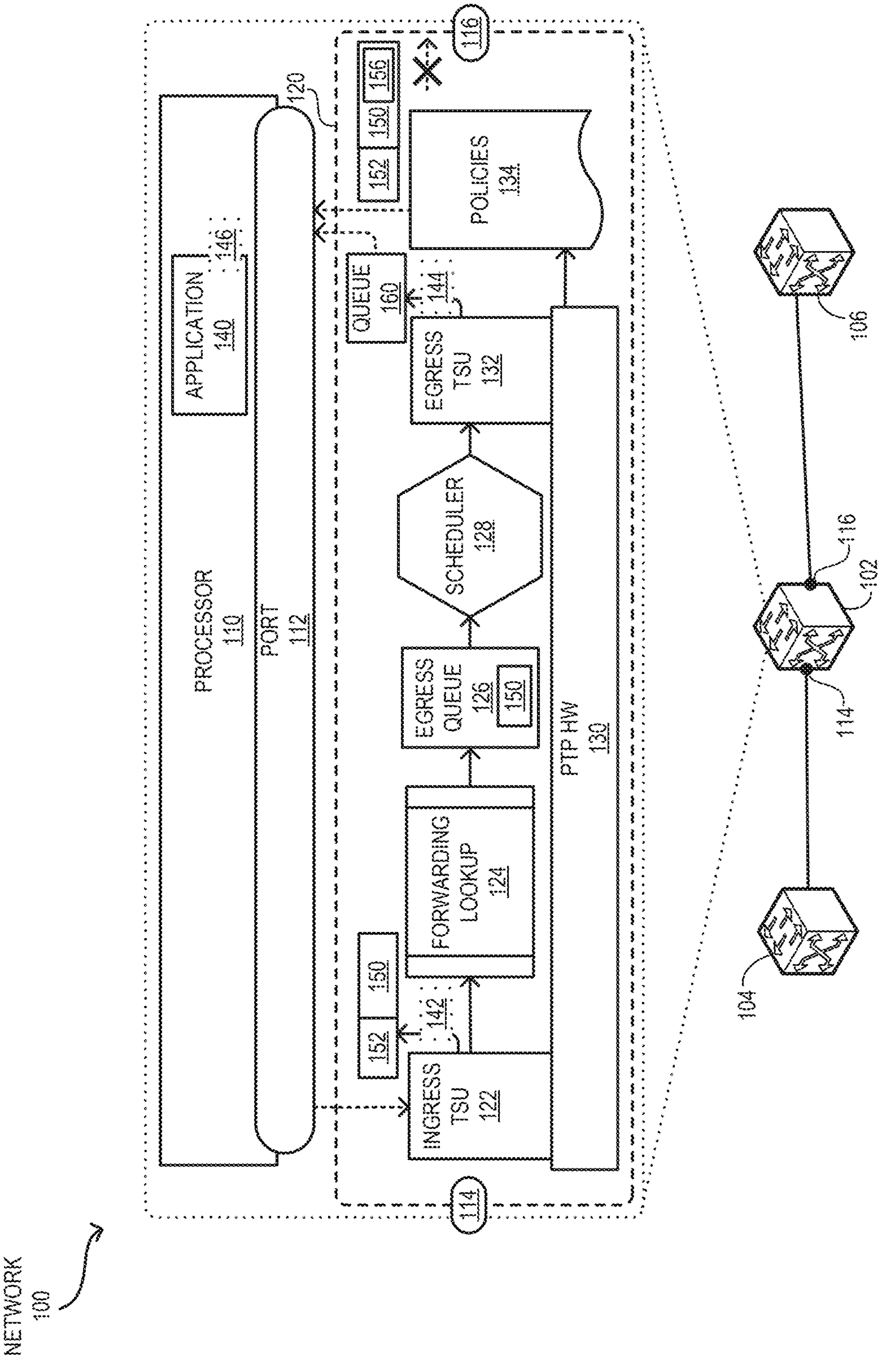
FIG. 1B illustrates an example of a network device measuring internal latency using a delay measurement packet and a timestamp queue, in accordance with an aspect of the present application.

FIG. 1B illustrates an example of a network device measuring internal latency using a delay measurement packet and a timestamp queue, in accordance with an aspect of the present application. In this example, PTP hardware 130 may not calculate internal delay 146 and, hence, does not include it in packet 150. Ingress TSU 122 can tag packet 150 with ingress timestamp 142, which can be included in metadata 152. Forwarding hardware 120 can insert packet 150 in queue 126. When scheduler 128 selects packet 150 for transmission, forwarding hardware 120 can retrieve packet 150 from queue 126. When packet 150 is extracted from queue 126 and ready for transmission, packet 150 has incurred the internal delay it is intended to measure.

Instead of tagging packet 150, egress TSU 132 can insert egress timestamp 144 in a timestamp queue 160 in forwarding hardware 120, in accordance with the PTP standard (e.g., the IEEE 1588 standard). Forwarding hardware 120 can send packet 150 and metadata 152, which can include ingress timestamp 142, via processor port 112 based on policies 134. Upon receiving packet 150, application 140 can obtain ingress timestamp 142 from metadata 152. Application 140 can then obtain egress timestamp 144 from the timestamp queue 160 via processor port 112. For example, application 140 can poll timestamp queue 160 to obtain egress timestamp 144. Application 140 can calculate internal delay 146 for packet 150 based on ingress timestamp 142 and egress timestamp 144.

Figure 2:
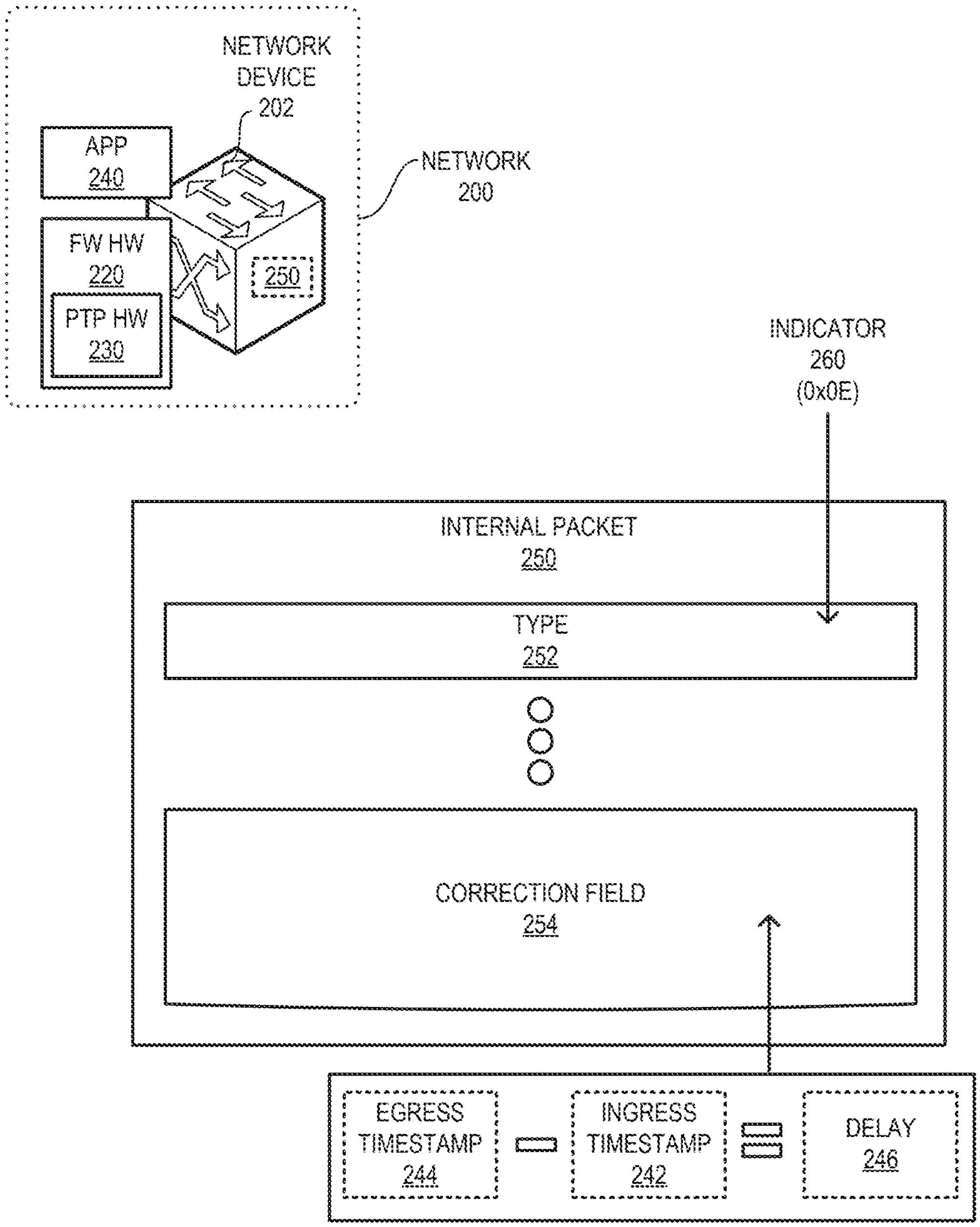
FIG. 2 illustrates an example of a delay measurement packet measuring the internal latency of a network device, in accordance with an aspect of the present application.

FIG. 2 illustrates an example of a delay measurement packet measuring the internal latency of a network device, in accordance with an aspect of the present application. A network 200 can be an Ethernet network, InfiniBand network, or other network, and may use a corresponding communication protocol, such as IP, FCOE, or other protocols. Network 200 can include a set of network devices, such as network device 202, which can be a physical network device or a networking unit (e.g., a switching unit, such as a switchblade) within a chassis. Network device 202 can be assigned a MAC address and an IP address and can include at least one processing resource. Examples of a processing resource can include, but are not limited to, a processor core, a GPU, and a TPU. Network device 202 can also include at least one non-transitory computer-readable medium storing instructions that, when executed by the processing resource, causes the processing resource to perform one or more operations. The network device can further include forwarding hardware (e.g., the ASIC of network device 202).

To determine the internal delay, network device 202 can run a monitoring application 240, which can be a software daemon executing on at least one processing resource of network device 202. Application 240 can record internal delays in network device 202 using PTP event packets. During operation, network device 202 can send internal packet 250 from application 240 to forwarding hardware 220 via a processor port of the processing resource executing application 240. The processor port can be distinct from the network ports of network device 202, which can couple network device 202 to links coupled to other devices. Therefore, the processor port can couple internal components of network device 202 while the network ports can externally couple network device 202 to other devices.

When network device 202, from application 240, issues packet 250 to forwarding hardware 220, network device 202 can include an indicator 260 that can indicate packet 250 as a delay measurement packet. Indicator 260 can also indicate packet 250 as a processor-generated packet instead of an actual PTP event packet. In some examples, indicator 260 can be a predefined value in a message type field 252 of packet 250. Message type field 252 can be a reserved field in a PTP event packet for indicating the type of packet 250. PTP supports a range of values that are reserved for user-defined purposes. An administrator can select a predefined value (e.g., "0x0E") from this range of values and configure network device 202 to include the value as indicator 260 in message type field 252. As a result, when indicator 260 is detected in packet 250, forwarding hardware 220 can determine packet 250 as a delay measurement packet and can apply one or more forwarding policies to packet 250.

In some examples, network device 202 can issue packet 250 from application 240. Since application 240 executes on a processing resource, forwarding hardware 220 can receive packet 250 from a processor port. Network device 202 can include PTP hardware 230 integrated into forwarding hardware 220 for processing PTP event packets, such as packet 250. When packet 250 arrives at forwarding hardware 220, PTP hardware 230 can tag packet 250 with an ingress timestamp 242, indicating when packet 250 is received by forwarding hardware 220. Forwarding hardware 220 can then internally forward packet 250 to an egress network port, as described in conjunction with FIG. 1A. When packet 250 arrives at the network port, packet 250 can be stored in an egress queue of the network port.

Subsequently, when the scheduler in forwarding hardware 220 can select packet 250 for transmission, forwarding hardware 220 can obtain packet 250 from the queue. PTP hardware 230 can then tag packet 250 with egress timestamp 244, indicating when packet 250 is obtained from the queue for transmission by forwarding hardware 220 in accordance with the PTP standard (e.g., the IEEE 1588 standard). PTP hardware 230 can then calculate internal delay 246 based on ingress timestamp 242 and egress timestamp 244. Here, internal delay 246 can be calculated as (timestamp 244-timestamp 242). Subsequently, PTP hardware 230 can include internal delay 246 in packet 250 in a correction field 254, which can be a reserved field in a PTP event packet for including the internal delay.

Figure 3:
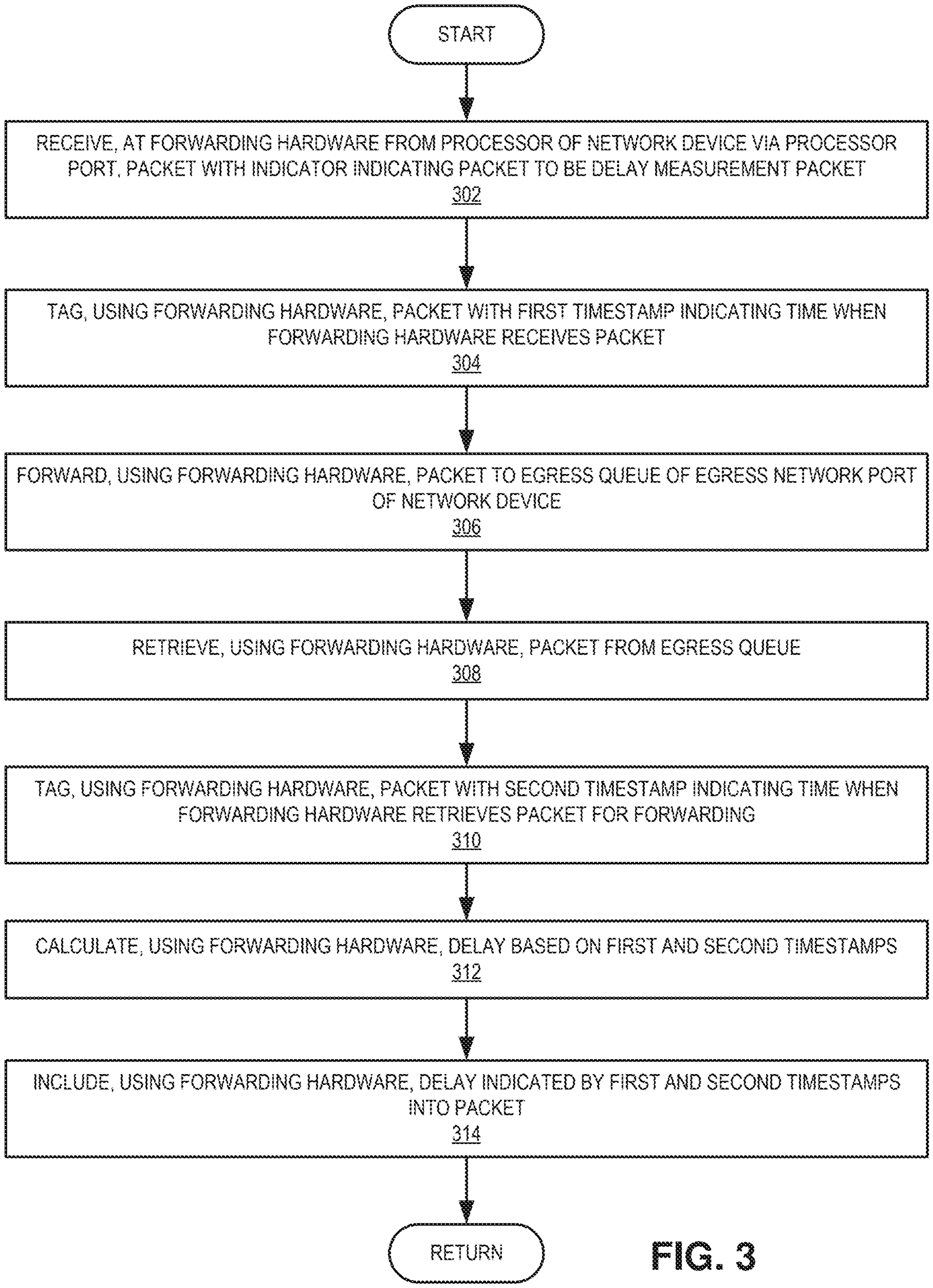
FIG. 3 presents a flowchart illustrating an example of a process of a network device measuring internal latency using a delay measurement packet, in accordance with an aspect of the present application.

FIG. 3 presents a flowchart illustrating an example of a process of a network device measuring internal latency using a delay measurement packet, in accordance with an aspect of the present application. During operation, the network device can receive, at the forwarding hardware from a processor of the network device via a processor port, a packet with an indicator indicating the packet to be a delay measurement packet (operation 302). The processor port can couple the processor to the forwarding hardware of the network device (e.g., via the backplane of the network device). As a result, instead of receiving the packet via an ingress network port, the forwarding hardware can receive the packet from the processor port of the processor. In the example in FIG. 1A, forwarding hardware 120 of network device 102 can receive packet 150 via processor port 112 of processor 110.

The network device can then tag, using the forwarding hardware, the packet with a first timestamp indicating a time when the forwarding hardware receives the packet (operation 304). Therefore, the first timestamp can indicate the ingress time for the packet. If the packet is a PTP event packet, the forwarding hardware can use an ingress TSU of its PTP hardware to tag the packet with the first timestamp. In the example in FIG. 1A, when forwarding hardware 120 receives packet 150, network device 102 can tag packet 150 with an ingress timestamp 142. The network device can determine to which egress network port the packet should go by performing a forwarding lookup based on information associated with the packet (e.g., forwarding metadata). Accordingly, the network device, using the forwarding hardware, can forward the packet to an egress queue of the egress network port of the network device (operation 306). In the example in FIG. 1A, forwarding hardware 120 can internally forward packet 150 to queue 126, which can then store packet 150.

Subsequently, a scheduler in the forwarding hardware can select the packet from the egress queue for transmission. When the scheduler selects the packet for transmission, the network device, using the forwarding hardware, can retrieve the packet from the egress queue (operation 308). In the example in FIG. 1A, when scheduler 128 selects packet 150 in egress queue 126 for transmission, forwarding hardware 120 can retrieve packet 150 from egress queue 126. The network device can then tag, using the forwarding hardware, the packet with a second timestamp indicating a time when the forwarding hardware retrieves the packet for forwarding (operation 310). When the packet is retrieved from the egress queue, the packet has incurred the internal delay it is intended to measure. Hence, the forwarding hardware can use an egress TSU of its PTP hardware to tag the packet with the second timestamp. In the example in FIG. 1A, network device 102 can tag packet 150 with egress timestamp 144, indicating when packet 150 is obtained from queue 126 by forwarding hardware 120.

The network device can calculate, using the forwarding hardware, a delay (e.g., an internal delay) based on the first and second timestamps (operation 312). If the first timestamp indicates a time $t_1$ and the second timestamp indicates a time $t_2$, the delay can be calculated as $(t_2-t_1)$. In the example in FIG. 1A, network device 102 can calculate internal delay 146 based on ingress timestamp 142 and egress timestamp 144. The network device can include, using the forwarding hardware, the delay indicated by the first and second timestamps into the packet (operation 312). For example, the delay can be included in a predetermined field in the packet. If the packet is a PTP event packet, the delay can be included in the correction field. In the example in FIG. 1A, network device 102 can include internal delay 146 in packet 150.

Figure 4A:
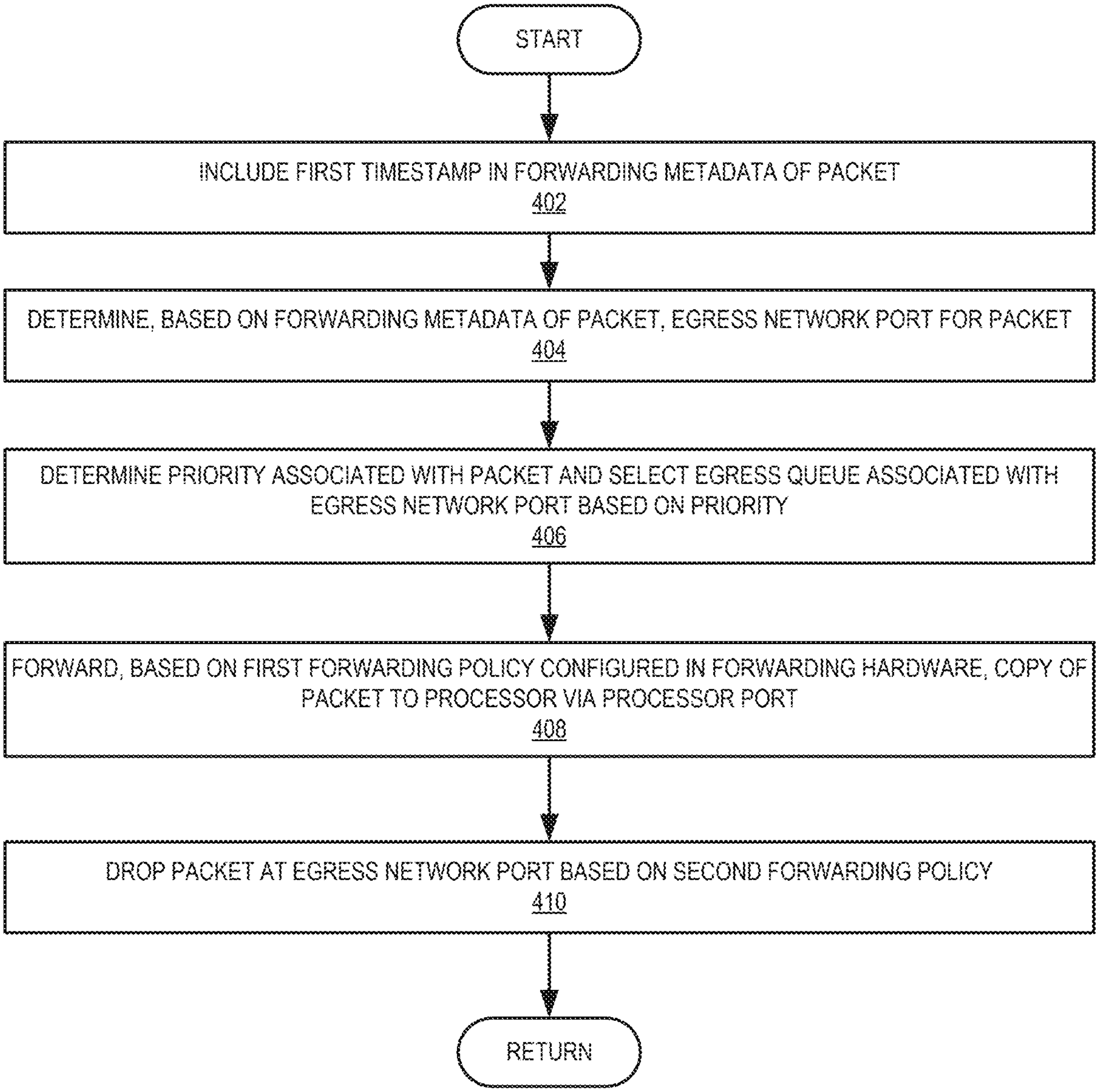
FIG. 4A presents a flowchart illustrating an example of a process of a network device forwarding a delay measurement packet for determining latency, in accordance with an aspect of the present application.

FIG. 4A presents a flowchart illustrating an example of a process of a network device forwarding a delay measurement packet for determining latency, in accordance with an aspect of the present application. During operation, the network device can include the first timestamp in the forwarding metadata of the packet (operation 402). Here, the packet and the timestamps can correspond to the packet and timestamps, respectively, of FIG. 3. The forwarding metadata can include information needed for internally forwarding the packet through the forwarding hardware within the network device. The forwarding metadata can be maintained in a storage medium (e.g., a register) in the forwarding hardware. When the packet is received by the forwarding hardware, the network device (e.g., using an ingress TSU) can include the first timestamp in the forwarding metadata. In the example in FIG. 1A, when packet 150 arrives at forwarding hardware 120, network device 102 can tag packet 150 with an ingress timestamp 142. Tagging packet 150 with timestamp 142 can include inserting timestamp 142 into forwarding metadata 152 (e.g., the ASIC metadata) associated with packet 150.

The network device then can determine, based on the forwarding metadata of the packet, an egress network port for the packet (operation 404). The forwarding metadata can include information indicating the egress network port for the packet. In the example in FIG. 1A, metadata 152 can include information indicating network port 116 as the egress network port for packet 150. Network device 102 can determine that packet 150 should be forwarded to network port 116 by performing forwarding lookup 124 on metadata 152. The network device can also determine a priority associated with the packet and select the egress queue associated with the egress network port based on the priority (operation 406). The egress network port may support multiple priorities, such as priority-based flow control provided by Ethernet. The egress network port can then be associated with a plurality of egress queues, each corresponding to a priority (e.g., as indicated in the IEEE 802.1Qbb standard). In the example FIG. 1A, the information in metadata 152 can indicate a priority for packet 150. If a priority is assigned to packet 150, egress queue 126 can be a priority queue associated with the corresponding priority. Hence, network device 102 can select egress queue 126 based on the priority indicated in metadata 152.

The network device can then forward, based on a first forwarding policy configured in the forwarding hardware, a copy of the packet to the processor via the processor port (operation 408). The forwarding hardware can be preprogrammed with a set of forwarding policies applicable to the packet. The forwarding policies can include dropping any packet with the indicator (e.g., a delay measurement packet) and sending a copy of such a packet via the processor port. As a result, the copy of the packet can be forwarded via the processor port. In the example in FIG. 1A, network device 102 can send packet 150, based on policies 134, from forwarding hardware 120 to processor port 112, thereby providing packet 150 comprising internal delay 146 to application 140. The network device can also drop the packet at the egress network port based on a second forwarding policy (operation 410). In the example in FIG. 1A, packet 150 is generated within network device 102. Therefore, packet 150 should not be forwarded via network port 116. Hence, network device 102 can drop packet 150 at network port 116 based on policies 134.

Figure 4B:
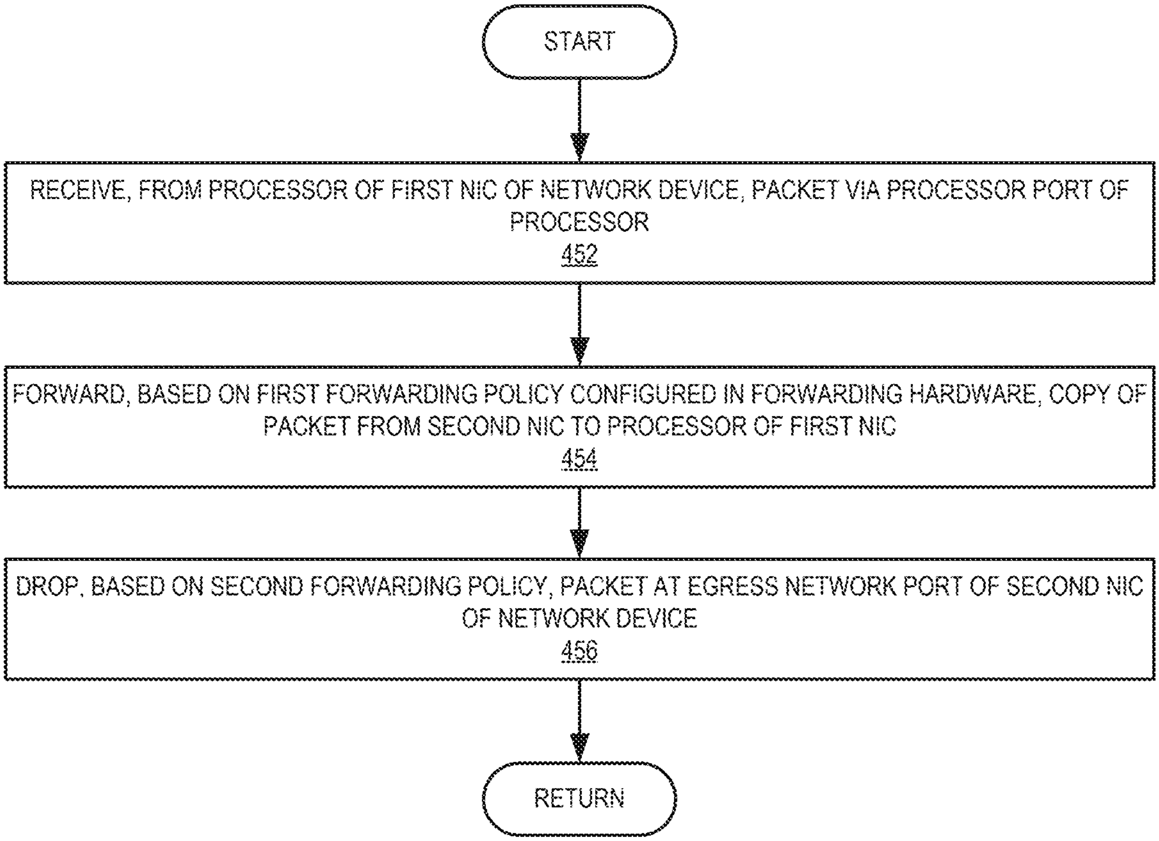
FIG. 4B presents a flowchart illustrating an example of a process of a network device forwarding a delay measurement packet between network interface controllers (NICs) for determining latency, in accordance with an aspect of the present application.

FIG. 4B presents a flowchart illustrating an example of a process of a network device forwarding a delay measurement packet between NICs for determining latency, in accordance with an aspect of the present application. Here, the packet and the network device can correspond to the packet and the network device, respectively, of FIG. 3. During operation, the network device can receive, from the processor of a first NIC of the network device, the packet via the processor port of the processor (operation 452). Here, the processor can correspond to the processor of FIG. 3. Therefore, the processor of the network device can be on the first NIC. The first NIC can be coupled to the forwarding hardware of the network device via an interface, such as a PCI or PCIe interface. In the example in FIG. 1A, processor 110 can be on the ingress NIC comprising network port 114.

The packet can be forwarded through the forwarding hardware of the network device to a second NIC, which includes the egress port for the packet. The packet can be placed in an egress queue of the egress port. The network device can forward, based on a first forwarding policy configured in the forwarding hardware, a copy of the packet from the second NIC to the processor of the first NIC (operation 456). In the example in FIG. 1A, network device 102 can send packet 150, based on policies 134, to processor 110 in the ingress NIC comprising network port 114 via the egress NIC comprising network port 116. The network device can then drop, based on a second forwarding policy, the packet at the egress network port of the second NIC (operation 456). In the example in FIG. 1A, network device 102 can drop packet 150 at network port 116 based on policies 134.

Figure 5:
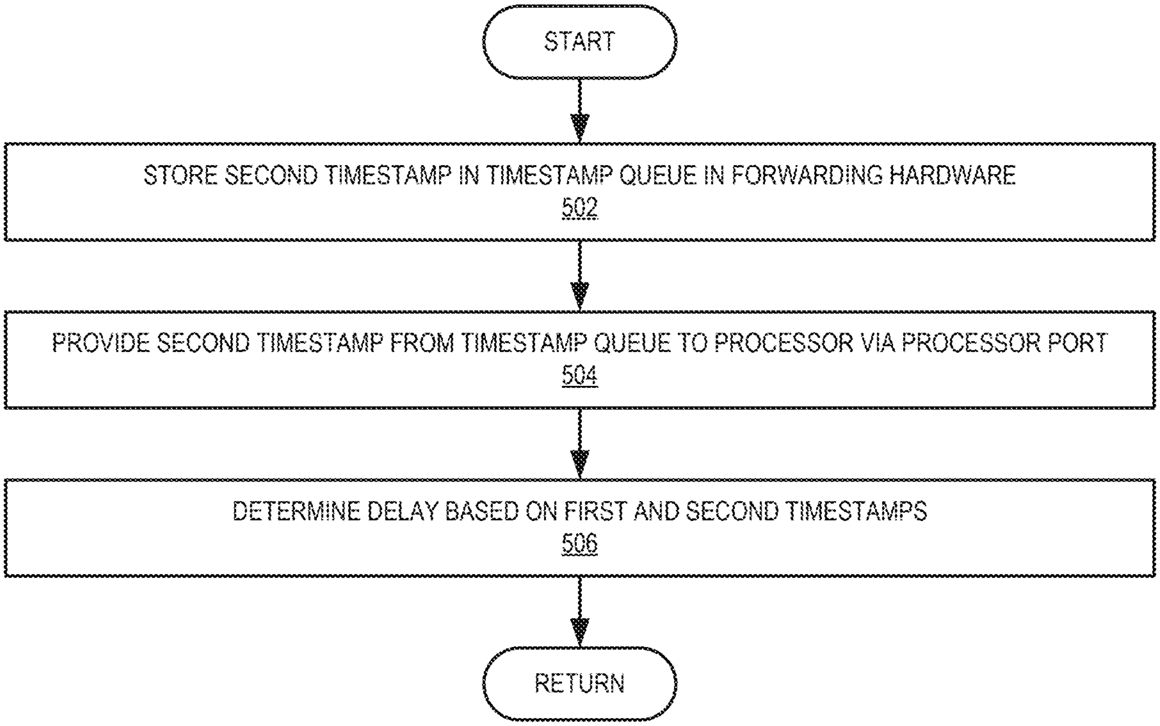
FIG. 5 presents a flowchart illustrating an example of a process of a network device using a timestamp queue for measuring internal latency, in accordance with an aspect of the present application.

FIG. 5 presents a flowchart illustrating an example of a process of a network device using a timestamp queue for measuring internal latency, in accordance with an aspect of the present application. During operation, the network device can store a second timestamp in a timestamp queue in the forwarding hardware (operation 502). Here, the second timestamp and the forwarding hardware can correspond to the second timestamp and the forwarding hardware, respectively, of FIG. 3. The forwarding hardware can still tag the packet with the first timestamp (i.e., the ingress timestamp) when the packet is received by the forwarding hardware. Instead of tagging the packet with the second timestamp (i.e., the egress timestamp), the forwarding hardware can insert the second timestamp in a timestamp queue in the forwarding hardware. In the example in FIG. 1B, egress timestamp 144 can be inserted into timestamp queue 160.

The network device can provide the second timestamp from the timestamp queue to the processor via the processor port (operation 504). Since the packet is tagged with the ingress timestamp, the forwarding metadata associated with the packet can include the first timestamp. By providing the second timestamp via the processor, the forwarding hardware can send the second timestamp to a monitoring application. In the example in FIG. 1B, upon receiving packet 150, application 140 can obtain ingress timestamp 142 from metadata 152. Application 140 can also obtain egress timestamp 144 from the timestamp queue 160 via processor port 112. The network device can then determine the delay based on the first and second timestamps (operation 506). The network device, using the monitoring application, can retrieve the first timestamp from the forwarding metadata of the packet and the second timestamp from the timestamp queue. Based on these timestamps, the network device can determine the delay. In the example in FIG. 1B, application 140 can calculate internal delay 146 for packet 150 based on ingress timestamp 142 and egress timestamp 144.

Figure 6:
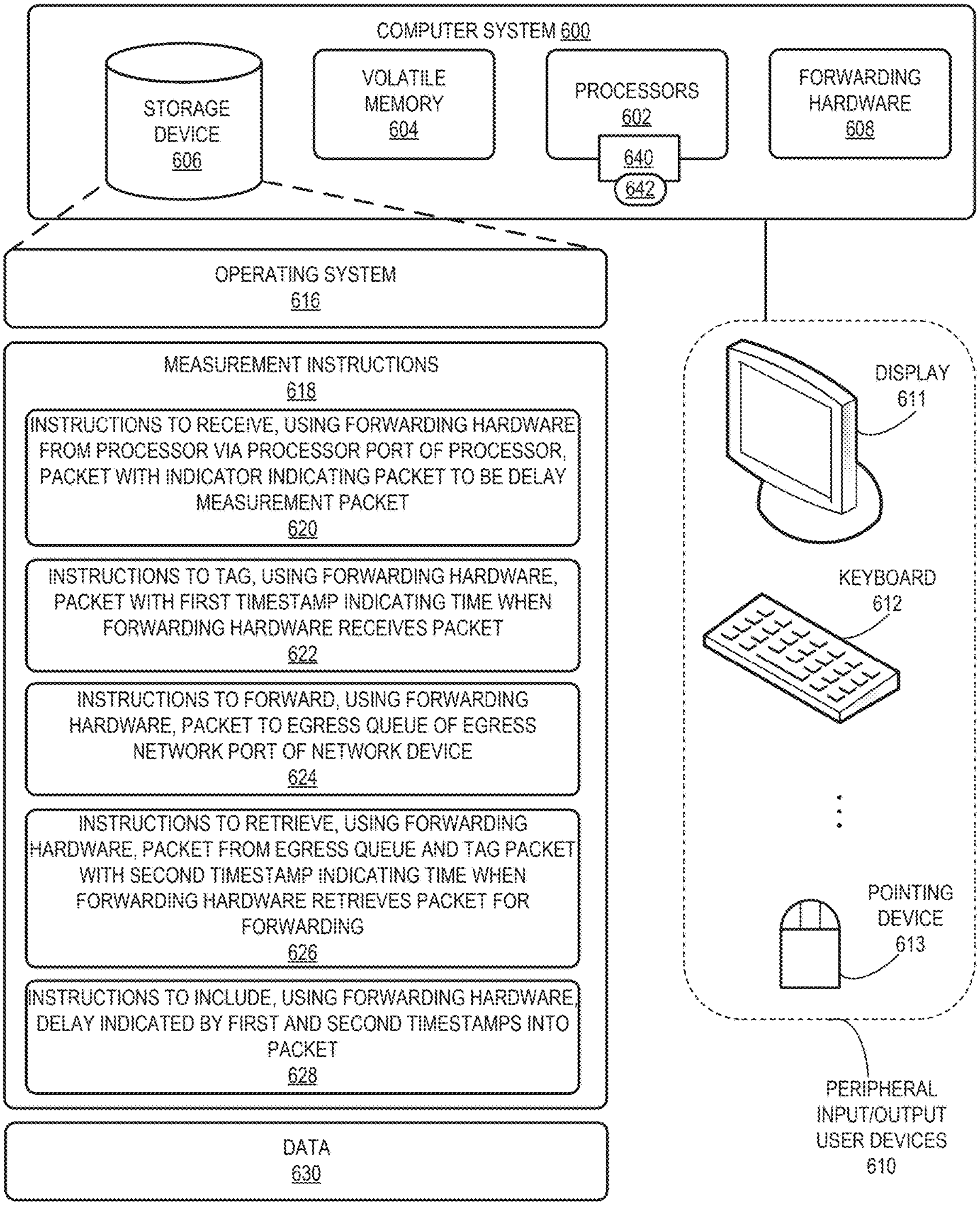
FIG. 6 illustrates an example of a computing system facilitating efficient internal latency measurement, in accordance with an aspect of the present application.

FIG. 6 illustrates an example of a computing system facilitating efficient internal latency measurement, in accordance with an aspect of the present application. Computer system 600 includes one or more processors 602, a memory 604, a storage device 606, and forwarding hardware 608.

Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Forwarding hardware 608 can include a TCAM. Storage device 606 includes a non-transitory computer-readable storage medium and stores an operating system 616, measurement instructions 618, and data 630. Computer system 600 may include fewer or more entities or instructions than those shown in FIG. 6.

Measurement instructions 618 can include instructions, which when executed by computer system 600, can cause computer system 600 to perform methods and/or processes described in this disclosure. Measurement instructions 618 can be executed on at least one of processors 602, forwarding hardware 608, or a combination thereof. Computer system 600 can be a network device, such as network device 102 in FIGS. 1A and 1B and network device 202 in FIG. 2. Specifically, measurement instructions 618 may include instructions 620 to receive, at forwarding hardware 608 from processor 640 of processors 602 via a processor port 642, a packet with an indicator indicating the packet to be a delay measurement packet. Processor port 642 can couple processor 640 to forwarding hardware 608 (e.g., via a backplane of computer system 600). As a result, instead of receiving the packet via an ingress network port, forwarding hardware 608 can receive the packet from processor port 642. In the example in FIG. 1A, forwarding hardware 120 of network device 102 can receive packet 150 via processor port 112 of processor 110.

Measurement instructions 618 may also include instructions 622 to tag, using forwarding hardware 608, the packet with a first timestamp indicating a time when forwarding hardware 608 receives the packet. Therefore, the first timestamp can indicate the ingress time for the packet. In the example in FIG. 1A, when forwarding hardware 120 receives packet 150, network device 102 can tag packet 150 with an ingress timestamp 142. Furthermore, measurement instructions 618 may also include instructions 624 to forward, using forwarding hardware 608, the packet to an egress queue of an egress network port of computer system 600. In the example in FIG. 1A, forwarding hardware 120 can internally forward packet 150 to queue 126, which can then store packet 150.

Measurement instructions 618 may include instructions 626 to retrieve, using forwarding hardware 608, the packet from the egress queue and tag the packet with a second timestamp indicating a time when forwarding hardware 608 retrieves the packet for forwarding. In the example in FIG. 1A, when scheduler 128 selects packet 150 in egress queue 126 for transmission, forwarding hardware 120 can retrieve packet 150 from egress queue 126. Network device 102 can then tag packet 150 with egress timestamp 144, indicating when packet 150 is obtained from queue 126 by forwarding hardware 120. Measurement instructions 618 may include instructions 628 to include, using forwarding hardware 608, the delay indicated by the first and second timestamps into the packet. In the example in FIG. 1A, network device 102 can include internal delay 146 in packet 150.

Data 630 can include any data that is required as input, or that is generated as output by the methods, operations, communications, and/or processes described in this disclosure. Specifically, data 630 can include information indicating a respective timestamp associated with the packet, an internal delay incurred by the packet, and the forwarding metadata of the packet. Data 630 can also include the policies in forwarding hardware 608 (e.g., policies 134 in forwarding hardware 120 of FIGS. 1A and 1B).

Computer system 600 and measurement instructions 618 may include more instructions than those shown in FIG. 6. For example, measurement instructions 618 can also store instructions for determining network port 116 as the egress network port in network device 102 of FIG. 1A; calculating internal delay 146 based on ingress timestamp 142 and egress timestamp 144 of FIG. 1A; forwarding packet 150 via processor port 112 and dropping packet 150 at network port 116 of network device 102 in FIG. 1A; determining a priority associated with packet 150 and selecting egress queue 126 based on the priority in FIG. 1A; forwarding packet 150 from an egress NIC to the processor of an ingress NIC of network device 102 in FIG. 1A; storing egress timestamp 144 in a timestamp queue 160 and retrieving egress timestamp 144 from timestamp queue 160 of network device 102 in FIG. 1B; including indicator 260 in type field 252 and internal delay 246 in correction field 254 of packet 250 of FIG. 2; the operations depicted in the flowcharts of FIGS. 3, 4, and 5; and the instructions of non-transitory CRM 700 in FIG. 7.

Figure 7:
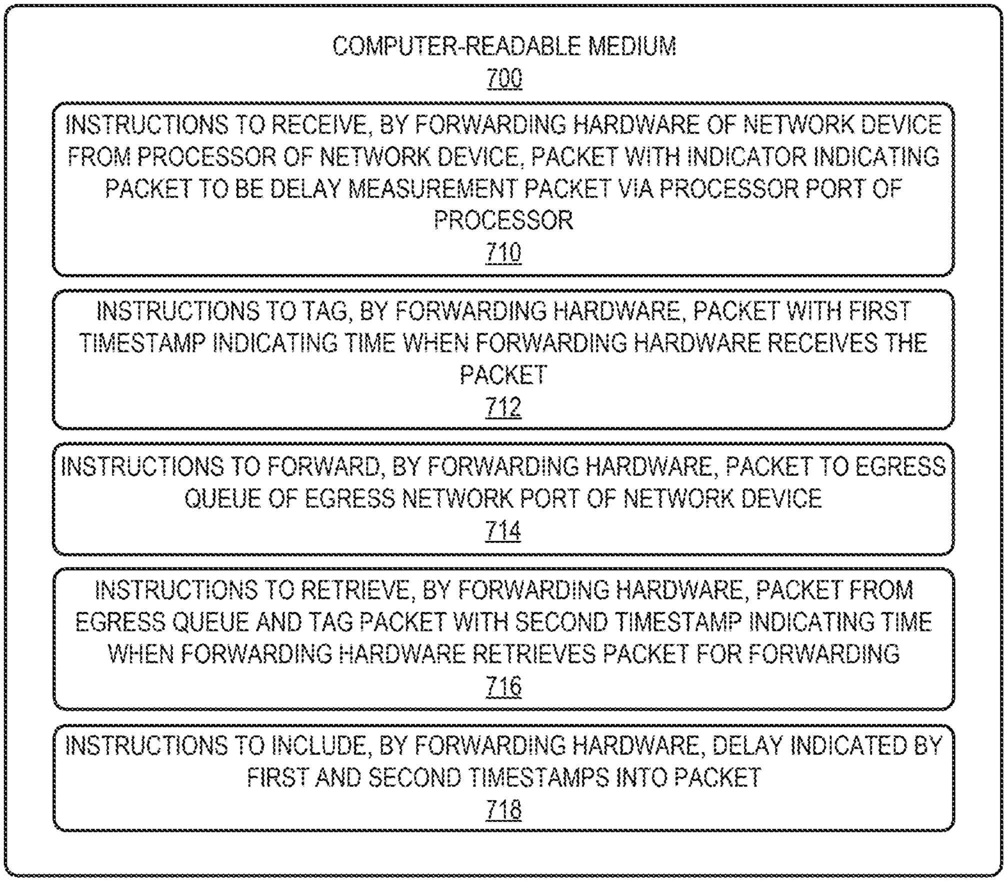
FIG. 7 illustrates an example of a computer-readable medium (CRM) facilitating efficient internal latency measurement in a network device, in accordance with an aspect of the present application.

FIG. 7 illustrates an example of a CRM facilitating efficient internal latency measurement in a network device, in accordance with an aspect of the present application. CRM 700 can include one or more non-transitory computer-readable mediums or devices storing instructions that, when executed by a computer or processor, cause the computer or processor to perform a method. Therefore, the instructions in CRM 700 can be stored in one or more non-transitory computer-readable mediums or devices. CRM 700 can store instructions 710 to receive, by the forwarding hardware of a network device from a processor via a processor port, a packet with an indicator indicating the packet to be a delay measurement packet. Here, the processor port can couple the processor to forwarding hardware (e.g., via a backplane of the network device). As a result, instead of receiving the packet via an ingress network port, the forwarding hardware can receive the packet from the processor port. In the example in FIG. 1A, forwarding hardware 120 of network device 102 can receive packet 150 via processor port 112 of processor 110.

CRM 700 can also include instructions 712 to tag, by the forwarding hardware, the packet with a first timestamp indicating a time when the forwarding hardware receives the packet. Therefore, the first timestamp can indicate the ingress time for the packet. In the example in FIG. 1A, when forwarding hardware 120 receives packet 150, network device 102 can tag packet 150 with an ingress timestamp 142. CRM 700 can include instructions 714 to forward, by the forwarding hardware, the packet to an egress queue of an egress network port of the network device. In the example in FIG. 1A, forwarding hardware 120 can internally forward packet 150 to queue 126, which can then store packet 150.

CRM 700 can also include instructions 716 to retrieve, by the forwarding hardware, the packet from the egress queue and tag the packet with a second timestamp indicating a time when the forwarding hardware retrieves the packet for forwarding. In the example in FIG. 1A, network device 102 can tag packet 150 with egress timestamp 144 indicating when packet 150 is obtained from queue 126 by forwarding hardware 120. Moreover, CRM 700 can include instructions 718 to include, by the forwarding hardware, a delay indicated by the first and second timestamps into the packet. In the example in FIG. 1A, network device 102 can include internal delay 146 in packet 150.

CRM 700 may include more instructions than those shown in FIG. 7. For example, CRM 700 can also store instructions for determining network port 116 as the egress network port in network device 102 of FIG. 1A; calculating internal delay 146 based on ingress timestamp 142 and egress timestamp 144 of FIG. 1A; forwarding packet 150 via processor port 112 and dropping packet 150 at network port 116 of network device 102 in FIG. 1A; determining a priority associated with packet 150 and selecting egress queue 126 based on the priority in FIG. 1A; forwarding packet 150 from an egress NIC to the processor of an ingress NIC of network device 102 in FIG. 1A; storing egress timestamp 144 in a timestamp queue 160 and retrieving egress timestamp 144 from timestamp queue 160 of network device 102 in FIG. 1B; including indicator 260 in type field 252 and internal delay 246 in correction field 254 of packet 250 of FIG. 2; the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a network. During operation, the network device can receive, at the forwarding hardware of the network device from a processor of the network device, a packet with an indicator indicating the packet to be a delay measurement packet via a processor port of the processor. The network device can then tag, using the forwarding hardware, the packet with a first timestamp indicating a time when the forwarding hardware receives the packet. The network device can then forward, using the forwarding hardware, the packet to an egress queue of an egress network port of the network device. Subsequently, the network device can retrieve, using the forwarding hardware, the packet from the egress queue and tag the packet with a second timestamp indicating a time when the forwarding hardware retrieves the packet for forwarding. The network device can include, using the forwarding hardware, a delay indicated by the first and second timestamps into the packet.

In a variation on this aspect, the network device can forward, based on a first forwarding policy configured in the forwarding hardware, a copy of the packet to the processor via the processor port of the processor. The network device can also drop the packet at the output egress network port based on a second forwarding policy.

In a variation on this aspect, the network device can determine, based on the forwarding metadata of the packet, the egress network port for the packet. The network device can also include the first timestamp in the forwarding metadata of the packet.

In a variation on this aspect, the processor can be a processor of a first NIC of the network device, and the egress network port can be on a second NIC of the network device.

In a further variation, the network device can forward, based on a forwarding policy configured in the forwarding hardware, a copy of the packet from the second NIC to the processor of the first NIC. The network device can also drop the packet at the egress network port.

In a variation on this aspect, the packet can be a Precision Time Protocol-Transparent Clock (PTP-TC) packet. The indicator can then be included in a message type of the PTP-TC packet.

In a variation on this aspect, the network device can calculate, using the forwarding hardware, the delay based on the first and second timestamps prior to incorporating the delay into the packet.

In a variation on this aspect, the network device can store, in a timestamp queue in the forwarding hardware, the second timestamp. The network device can then obtain, by the processor, the second timestamp via the processor port from the timestamp queue and determine the delay based on the first and second timestamps.

In a variation on this aspect, the network device can determine, by the forwarding hardware, a priority associated with the packet. The network device can then select the egress queue based on the priority.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by forwarding hardware of a network device from a processor of the network device, a packet with an indicator indicating the packet to be a delay measurement packet via a processor port of the processor;

tagging, by the forwarding hardware, the packet with a first timestamp indicating a time when the forwarding hardware receives the packet;

forwarding, by the forwarding hardware, the packet to an egress queue of an egress network port of the network device;

retrieving, by the forwarding hardware, the packet from the egress queue;

in response to the packet being retrieved from the egress queue, tagging, by the forwarding hardware, the packet with a second timestamp indicating a time when the forwarding hardware retrieves the packet for forwarding; and including, by the forwarding hardware, a delay indicated by the first and second timestamps into the packet.

2. The method of claim 1, further comprising:

forwarding, based on a first forwarding policy configured in the forwarding hardware, a copy of the packet to the processor via the processor port of the processor; and dropping the packet at the output egress network port based on a second forwarding policy.

3. The method of claim 1, further comprising:

determining, based on forwarding metadata of the packet, the egress network port for the packet; and including the first timestamp in the forwarding metadata of the packet.

4. The method of claim 1, wherein the processor is a processor of a first network interface controller (NIC) of the network device, and wherein the egress network port is on a second NIC of the network device.

5. The method of claim 4, further comprising:

forwarding, based on a forwarding policy configured in the forwarding hardware, a copy of the packet from the second NIC to the processor of the first NIC; and dropping the packet at the egress network port.

6. The method of claim 1, wherein the packet is a Precision Time Protocol-Transparent Clock (PTP-TC) packet, and wherein the indicator is included in a message type of the PTP-TC packet.

7. The method of claim 1, further comprising calculating, by the forwarding hardware, the delay based on the first and second timestamps prior to incorporating the delay into the packet.

8. The method of claim 1, further comprising:

storing, in a timestamp queue in the forwarding hardware, the second timestamp;

obtaining, by the processor, the second timestamp via the processor port from the timestamp queue; and determining, by the processor, the delay based on the first and second timestamps.

9. The method of claim 1, further comprising:

determining, by the forwarding hardware, a priority associated with the packet; and selecting the egress queue based on the priority.

10. A non-transitory computer-readable storage medium storing instructions to:

receive, by forwarding hardware of a network device from a processor of the network device, a packet with an indicator indicating the packet to be a delay measurement packet via a processor port of the processor;

tag, by the forwarding hardware, the packet with a first timestamp indicating a time when the forwarding hardware receives the packet;

forward, by the forwarding hardware, the packet to an egress queue of an egress network port of the network device;

retrieve, by the forwarding hardware, the packet from the egress queue;

in response to the packet being retrieved from the egress queue, tag, by the forwarding hardware, the packet with a second timestamp indicating a time when the forwarding hardware retrieves the packet for forwarding; and include, by the forwarding hardware, a delay indicated by the first and second timestamps into the packet.

11. The non-transitory computer-readable storage medium of claim 10, wherein the instructions are further to:

forward, based on a first forwarding policy configured in the forwarding hardware, a copy of the packet to the processor via the processor port of the processor; and drop the packet at the output egress network port based on a second forwarding policy.

12. The non-transitory computer-readable storage medium of claim 10, wherein the instructions are further to:

determine, based on forwarding metadata of the packet, the egress network port for the packet; and include the first timestamp in the forwarding metadata of the packet.

13. The non-transitory computer-readable storage medium of claim 10, wherein the processor is a processor of a first network interface controller (NIC) of the network device, and wherein the egress network port is on a second NIC of the network device.

14. The non-transitory computer-readable storage medium of claim 13, wherein the instructions are further to:

forward, based on a forwarding policy configured in the forwarding hardware, a copy of the packet from the second NIC to the processor of the first NIC; and drop the packet at the egress network port.

15. The non-transitory computer-readable storage medium of claim 10, wherein the packet is a Precision Time Protocol-Transparent Clock (PTP-TC) packet, and wherein the indicator is included in a message type of the PTP-TC packet.

16. The non-transitory computer-readable storage medium of claim 10, wherein the instructions are further to calculate, by the forwarding hardware, the delay based on the first and second timestamps prior to incorporating the delay into the packet.

17. The non-transitory computer-readable storage medium of claim 10, wherein the instructions are further to:

store, in a timestamp queue in the forwarding hardware, the second timestamp;

obtain, by the processor, the second timestamp via the processor port from the timestamp queue; and determine, by the processor, the delay based on the first and second timestamps.

18. The non-transitory computer-readable storage medium of claim 10, wherein the instructions are further to:

determine, by the forwarding hardware, a priority associated with the packet; and select the egress queue based on the priority.

19. A computer system, comprising:

at least one processing resource;

forwarding hardware; and a non-transitory computer-readable storage medium storing instructions that when executed by the processing resource cause the computer system to:

receive, at the forwarding hardware from the at least one processing resource, a packet with an indicator indicating the packet to be a delay measurement packet via a processor port of the at least one processing resource;

tag, by the forwarding hardware, the packet with a first timestamp indicating a time when the forwarding hardware receives the packet;

forward, by the forwarding hardware, the packet to an egress queue of an egress network port of the network device;

retrieve, by the forwarding hardware, the packet from the egress queue;

in response to the packet being retrieved from the egress queue, tag, by the forwarding hardware, the packet with a second timestamp indicating a time when the forwarding hardware retrieves the packet for forwarding; and include, by the forwarding hardware, a delay indicated by the first and second timestamps into the packet.

20. The computer system of claim 19, wherein the instructions that when executed by the processing resource cause the computer system to:

forward, based on a first forwarding policy configured in the forwarding hardware, a copy of the packet to the processor via the processor port of the processor; and drop the packet at the output egress network port based on a second forwarding policy.

* * * * *